May 16, 1967 E. MASTERSON 3,319,955

CARD STOP ACTUATOR

Filed Feb. 1, 1965 2 Sheets-Sheet 1

INVENTOR
EARL MASTERSON

BY

ATTORNEY

United States Patent Office 3,319,955

Patented May 16, 1967

3,319,955
CARD STOP ACTUATOR

Earl Masterson, Newtonville, Mass., assignor to Sperry Rand Corporation, New York, N.Y., a corporation of Delaware Filed Feb. 1, 1965, Ser. No. 429,502
3 Claims. (Cl. 271—60)

This invention relates to apparatus for accurately and simply controlling the position of a business card as it is being operated upon by a punch mechanism, or the like.

As is well known, business or record cards are conveyed under a punch mechanism which is selectively actuated to punch holes in the card according to the intelligence to be recorded. Usually the card stores the information thereon in the form of holes in discrete columns and rows. For accurate recording and later retrieval of the data on the card it is important if not essential that the position of card be accurately determined for each punch operation, so that each column or row of data on the card occupies a predetermined position.

Many methods have heretofore been employed for advancing the card in discrete increments and controlling its position before each punch operation. The apparatus employed in the instant invention employs in its preferred form an intermittent card advance mechanism and a plurality of sequentially actuated stop bars which are withdrawn from the path of the card in a predetermined order. Stop bars are spaced one column or row apart or an integral multiple thereof. As the record card is advanced and passes under the punch mechanism, the stop bars are sequentially withdrawn from the card path at a position past the punch mechanism. Each time the card is moved, the leading edge thereof is forced against the next sequential stop bar and is accurately positioned. In the instant invention, the mechanism for controlling the stop bar takes the form of a novel and easily constructed assembly wherein each stop bar is sequentially placed in a first position in the card path, and then removed therefrom and placed in a second or withdrawn position. In the preferred form of the invention, the mechanism controlling the stop bar comprises a pair of flexure springs each mounted at one end to the machine frame and at the other end to the top and bottom of an E shaped armature. The stop bar is secured to the top flexure spring so that the top arm of the armature, the top flexure spring and stop bar form an integral unit. The middle arm of the armature has an induction coil mounted thereon, and is placed between two oppositely poled permanent magnets. The flat flexure springs are supporting elements for the stop member and armature and replace mechanical pivots which otherwise would be used. They are long life elements and provide for parallel motion and zero play.

To move the stop bar from an initial position in the card path to a position out of the card path, a current is passed through a coil on the middle arm of the armature setting up a field which causes the armature to be attracted to the permanent magnet below the center arm whereby the entire assembly including the stop bar moves downwardly, so that the stop bar is withdrawn from the card path. To insert the stop bar in the card path, a second current is applied to the coil on the center arm whereby a field is generated and causes the armature to move toward the permanent magnet above the center arm whereby the entire assembly is moved upwardly and the stop bar is inserted into the card path.

By employing the above technique only short electrical pulses need be applied to the coil to move the stop bar to the up or down position. In either of the aforementioned positions, the stop member is locked in place by the action of the permanent magnets after the actuating current applied to the coil has ceased.

Accordingly, it is an object of this invention in a record card punching apparatus to provide a novel means for positively interrupting and stopping the passage of the card at a plurality of discrete positions as it passes through the punch mechanism of said apparatus.

It is another object of this invention to provide in a record card punching apparatus a means for inserting a stop member in the card path of such apparatus, and for selectively withdrawing such a stop member.

It is yet another object of this invention to provide in a record card punching apparatus a stop member which has two discrete positions.

Still a further object of this invention is to provide a pulse actuated stop member wherein only a pulse of short duration is necessary to operate the stop member, and wherein the stop member locks in position even after said pulse is removed.

Another object of this invention is to provide a stop member assembly for a record card machine which is mounted on flexure springs.

Other objects and advantages will be suggested in the description and drawings of the apparatus embodying this invention. In the drawings.

Figure 1:
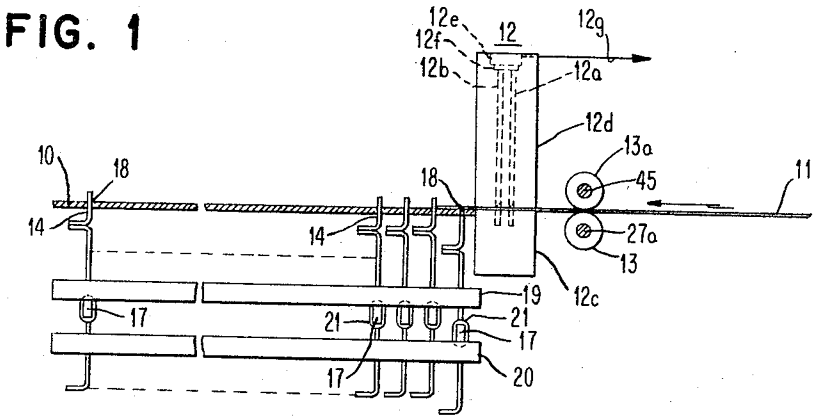
FIGURE 1 is a schematic representation illustrating the card mechanism in conjunction with the card transport means.

Referring now to FIGURE 1, there is shown a card bed 10 upon which record cards 11 are transported from a card bin (not shown) to a punch station 12 by means of a plurality of skid rollers. Two such skid roller 13 and **13*a* are shown. In this embodiment, the record cards are end fed so that column 1 of the record card reaches the punch station 12 first. The skid rollers 13 and 13*a* are driven by a motor-slip clutch arrangement (not shown). The skid rollers 13 and 13*a* will attempt to continuously move card 11 through the punch station 12 and will do so if the movement of the card 11 is not impeded. When the leading edge of card 11 strikes a card stop, as will be described below, the skid rollers 13 and 13*a* will slip and fail to move the card 11 until the stop is removed. The rollers 13 and 13*a* move the card 11 two columns per step through the punch station 12. The punch station 12 contains two sets of punches 12*a* and 12*b* wherein each set contains enough individual punches for all the positions that can be punched in any column of the record card 11. The set of punches 12*a* and 12*b* are spaced one column apart. The punch station 12 also comprises the usual means 12*d* for guiding the punches 12*a* and 12*b* as well as the die 12*c* for receiving the punch and card. Since the card is advanced two columns at a time, the set of punches 12*a* and 12*b* are selectively operated simultaneously to punch the information in two columns at a time on the record 11. The sets of punches 12*a* and 12*b*** may be selectively driven by the usual means which includes selectively operable interposers (not shown) and a bail (not shown) to supply power.

A sensing switch **12*e* with a movable arm 12*f* is placed above the punches 12*a* and 12*b*. When the punches have been returned to their pre-punching position or reset, the arm 12*f* is moved closing the switch. The switch 12*e* is connected via cable 12*g* to the punch control (not shown) and to the stop control comprising stepping motor 42 and pulse source 41 (FIG. 3) to be described. Each time the switch 12e is closed, the punch control is rendered operative so that a further punch operation may begin. Closure of switch 12e also renders source 41 and motor 42** operative to function in the manner to be described.

As the card 11 leaves the punch station 12 on the card bed 10, the leading edge of the card is pushed against the stops 14. The stops 14 are normally positioned within the card bed 10 in such a position as to prevent movement of a card 11 along the card bed 10. The stops 14 are then sequentially lowered through the openings 18 in the card bed 10 just after the completion of each punching operation. The stops 14 and the openings 18 in alignment therewith are spaced two columns apart so the card may be accurately positioned for the following two column punching operation.

The apparatus for raising and lowering the stops 14 in sequence includes a pair of oppositely poled permanent magnets 19 and 20 and an armature 17 to which the stop 14 is attached. These aforementioned elements are shown more clearly in FIGURES 2 and 3 to which reference is now made in conjunction with FIGURE 1. The stop bar mechanism comprises, as shown, an E shaped armature wherein at least the middle arm thereof is made of a magnetizable material. The middle arm of armature 17 has a coil 21 mounted thereon which receives current through leads 22, 23 and 24. (See FIG. 3.) The coil 21 comprises a pair of windings which are wound oppositely from each other around the middle arm of armature 17. (see FIG. 3*a*.) Lead 22 may be grounded and is common to both windings of coil 21 whereas leads 23 and 24 are connected to separate windings. The middle arm of armature 17 fits between oppositely poled magnets 19 and 20 so that when one of the windings of coil 21 receives current through lead 24 a flux is generated in the middle arm of armature 17 causing that arm to be attracted to the upper magnet 19 and repelled from the lower magnet 20. When current is transmitted to lead 23 of the other winding, flux in an opposite direction is generated through the middle arm of armature 17, so that it is attracted to the lower magnet 20 and repelled by the upper magnet 19.

Figure 2:
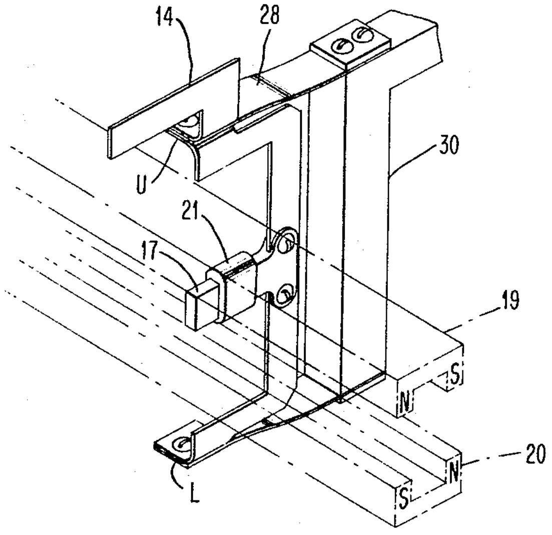
FIGURE 2 is a perspective view of the card stop mechanism.

Both the upper and lower arms of E shaped armature 17 have the end portions thereof bent at right angle to the main body of the armature as shown in FIGURE 2. The bent portion L of the lower arm has attached thereto one of the flat flexure springs 29. The other end of spring 29 is attached to leg 30 which in turn is connected to the main frame of the card punching mechanism by a pair of screws. Leg 30 is substantially the same height as armature 17. A second flat spring 28 is connected at one end to the top of leg 30 and at the other end to the bent portion U of the upper arm of armature 17 also. The portion U of the upper arm of armature 17 has connected to it the stop member 14. Thus, it can be observed from FIGURE 2, stops 14 has a portion thereof which is also bent at right angles to the main body of the stop, and it is this bent portion that is connected to the spring 28 at the top of the armature 17.

Figure 3:
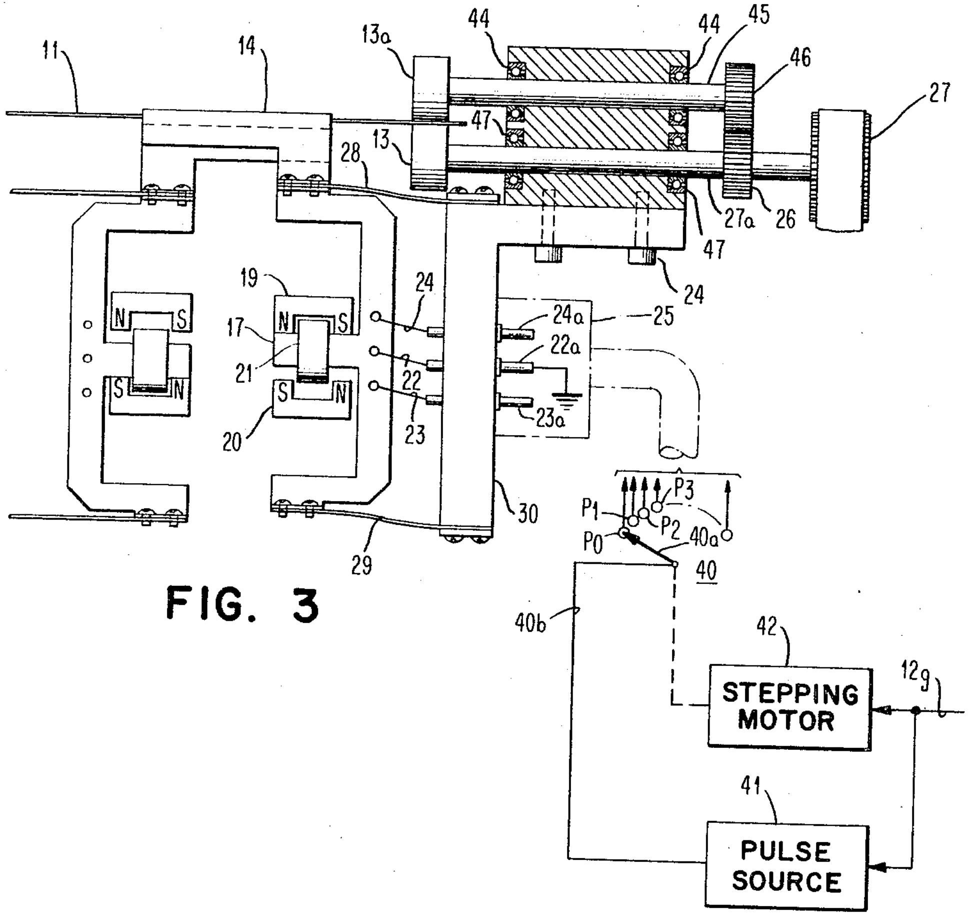
FIGURE 3 is a side elevation showing the details of the stop mechanism and card drive and FIGURE 3*a* is a schematic drawing illustrating a portion of the card stop mechanism.
Figure 3A:
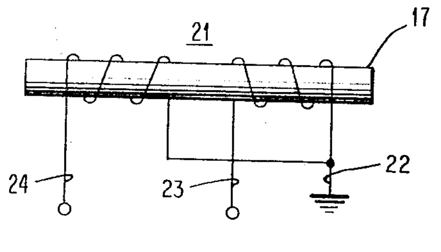

Referring now to FIGURE 3, it can be seen that the leads 22 to 24 are connected through pins 22a to 24a respectively of plug 25 to the distributor or rotary switch 40 which produces short duration pulses in sequence at output terminals $P_0$ to $P_n$, where *n* is equal to the number of stops 14 employed. The terminal $P_0$ is connected to the lead 24 of each stop member, whereas the remaining terminals $P_1$ to $P_n$ are connected to lead 23 of their respective stops; e.g., terminal $P_1$ is connected to lead 23 of the first stop 14, etc.

The rotatable arm 40a of distributor 40 is connected by lead 40b to a pulse source 41 which is in turn connected via cable 12g to the output of sensing switch 12e (FIG. 1) of the punch station 12. The movable arm of distributor 40 is mechanically linked to stepping motor 42 which is also coupled via cable 12g to the switch 12e. When the sensing switch is closed it will provide a signal to the stepping motor 42 to cause the rotatable arm 40a of distributor 40 to be advanced to the next terminal as well as a signal to the pulse source 41 to apply a pulse to the terminal now contacted by arm 40a.

The pulley 27 to which drive is applied by means not shown is coupled to shaft 27a upon which is mounted a gear 26 and skid roll 13. The shaft 27a is supported by bushings 47. Gear 26 meshes with another gear 46 which is mounted on shaft 45. Shaft 45 is in turn supported by bushing 44. Coupled to the end of shaft 45 above the skid roll 30 is another skid roll 13a, and between the two skid rolls 13 and 13a the cards are pushed on card bed 10. Other skid rollers are suitably coupled to the drive pulley 27 to advance the card 11 past the punch station 12.

In operation, the resetting of the punches 12a and 12b after the last punch operation on the previous card 11 causes the closure of the sensing switch 12e producing a signal on lead 12g which is applied to the stepping motor 42 and the pulse source 41. The rotatable arm 40a is advanced to terminal $P_0$ (connected to the leads 24a of all the stops 14) and upon application of the pulse from the pulse source 41 all the stops 14 are moved in their openings 18 to extend into the card path. The card 11 will now be moved along the card bed 10 by skid rollers 13 and 13a until the leading edge of card 11 strikes the first stop 14 at which time card movement stops. The punch operation will take place and when sensing switch 12e is closed due to the resetting of the punches 12a and 12b, a signal will be produced on lead 12g. The signal on lead 12g will cause the stepping motor 42 to advance rotating arm 40a of the distributor 40 to terminal $P_1$. The signal on lead 12g will also cause the pulse source 41 to apply a pulse via lead 40b, the arm 40a to terminal $P_1$. Since terminal $P_1$ is connected to lead 23 of the first stop 14, the pulse will cause a current to flow in coil 21 inducing a flux in the center arm of armature 17, whereby the arm is attracted to permanent magnet 20, and repelled by permanent magnet 19. As the center arm moves downwardly, the entire E shaped armature is moved on its flexure spring mountings 28 and 29 and the stop 14 is withdrawn through opening 18 from the card path. The stop 14 will be retained in this position despite the termination of the pulse from pulse source 41 due to the contact between the middle arm of armature 17 and the permanent magnet 20 acting as a latch. With the first stop 14 removed from the card path the skid rollers 13 and 13a are again able to move the card 11 along the card bed 10 until the second stop 14 is contacted by the leading edge of the card 11 at which time the card movement stops as described above. FIG. 1 illustrates the card 11 position contacting the second stop 14. The punching operation will now take place and as the punches 12a and 12b are reset the operation described above will be repeated, but this time with respect to the second stop 14. The operations just described will be repeated until all 80 column positions have been presented to the punch station 12 and the card 11 is moved to the output stacker (not shown).

While there have been shown and described and pointed out the fundamental novel features of the invention as applied to the preferred embodiments, it will be understood that various omissions and substitutions and changes of the form and details of the devices illustrated and in its operation may be made by those skilled in the art, without departing from the spirit of the invention.

The embodiments of the invention in which an exclusive property or privilege is claimed are defined as follows:

1. In a record card transport apparatus the combination comprising a card operating station for operating upon record cards, a card bed provided with a card path for delivering said record cards by said operating station, drive means operatively associated with said bed for moving said card by said operating station, and a selectively operable card stop apparatus including an E shaped magnetizable armature having two outer arms and a center arm and having a coil means wrapped about the center arm thereof, a first permanent magnet poled in a first direction positioned above the center arm of said armature, a second permanent magnet poled in a second direction positioned below the center arm of said armature, a movable stop member connected to one of the outer arms of said armature and in spaced relationship with said card bed and electric pulse generating means for momentarily energizing said coil means to magnetize said armature in the first polarity whereby said armature is attracted to one of said permanent magnets and said stop member is moved from said card path.

2. The apparatus defined in claim 1 further including first and second flexure springs for supporting said card stop apparatus wherein said first flexure spring is connected at one end to said stop member and one of said outer arms and lies intermediate said stop member and one of said outer arms, the second end of said first flexure spring is connected to said transport apparatus and said second flexure spring is connected between the other outer arm of said armature and said transport apparatus.

3. The apparatus defined in claim 2 wherein said card bed includes an aperture therein and said stop member is positioned below and in alignment with said aperture.

References Cited by the Examiner

UNITED STATES PATENTS

| | | | |
|---|---|---|---|
| 2,787,951 | 4/1957 | Shipley et al. | 271—60 X |
| 2,970,751 | 2/1961 | Daly et al. | 271—60 X |
| 3,072,397 | 1/1963 | Kelchner | 271—53 |

ROBERT B. REEVES, *Primary Examiner.*

F. R. HANDREN, *Assistant Examiner.*